United States Patent
Jeong et al.

(10) Patent No.: US 8,150,076 B2
(45) Date of Patent: Apr. 3, 2012

(54) SOUND CONVERTER WITH ENCLOSURE

(75) Inventors: Seung-Kiu Jeong, Busan (KR);
Cheon-Myeong Kim, Gimhae-shii (KR); Dong-Kyu Lee, Busan (KR)

(73) Assignee: Em-Tech. Co., Ltd., Busan (KR)

( * ) Notice: Subject to any disclaimer, the term of this patent is extended or adjusted under 35 U.S.C. 154(b) by 380 days.

(21) Appl. No.: 12/513,897

(22) PCT Filed: Aug. 21, 2007

(86) PCT No.: PCT/KR2007/003999
§ 371 (c)(1),
(2), (4) Date: May 7, 2009

(87) PCT Pub. No.: WO2008/060026
PCT Pub. Date: May 22, 2008

(65) Prior Publication Data
US 2010/0246881 A1 Sep. 30, 2010

(30) Foreign Application Priority Data

Nov. 18, 2006 (KR) .................. 10-2006-0114197

(51) Int. Cl.
H04R 1/00 (2006.01)
(52) U.S. Cl. .................. 381/152; 381/306; 381/396
(58) Field of Classification Search .................. 381/152, 381/306, 333, 386, 388, 396, 397
See application file for complete search history.

(56) References Cited

U.S. PATENT DOCUMENTS

| | | | | |
|---|---|---|---|---|
| 4,085,289 A | * | 4/1978 | Schmideler | 381/86 |
| 5,550,926 A | * | 8/1996 | Tsao | 381/386 |
| 5,828,766 A | * | 10/1998 | Gallo | 381/190 |
| 2004/0043801 A1 | | 3/2004 | Shimokawatoko et al. | |

FOREIGN PATENT DOCUMENTS

| | | |
|---|---|---|
| EP | 0598556 | 5/1994 |
| EP | 0623913 | 11/1994 |
| JP | 6165294 | 6/1994 |

OTHER PUBLICATIONS

International Search Report dated Feb. 4, 2008 for PCT/KR2007/003999.
Korean Office Action issued on corresponding Korean Patent Application No. 2006-114197.

* cited by examiner

*Primary Examiner* — Richard A. Booth
(74) *Attorney, Agent, or Firm* — Edwards Wildman Palmer LLP

(57) ABSTRACT

The present invention discloses a sound converter with an enclosure which utilizes an outer space to expand a resonance space. The sound converter with the enclosure includes a frame being equipped with a magnetic circuit for forming a magnetic field in a predetermined gap, a voice coil at least partially positioned in the gap, a diaphragm adhered to the voice coil and inserted into a diaphragm seating portion of the frame, a protector formed at the upper portion of the diaphragm, and an enclosure case coupled to the frame, for defining the inner space of the enclosure which is the resonance space. A vent is provided at the enclosure case so that the inner space of the enclosure can communicate with the outer space. This configuration can secure a wide resonance space.

19 Claims, 5 Drawing Sheets

[Fig. 1]
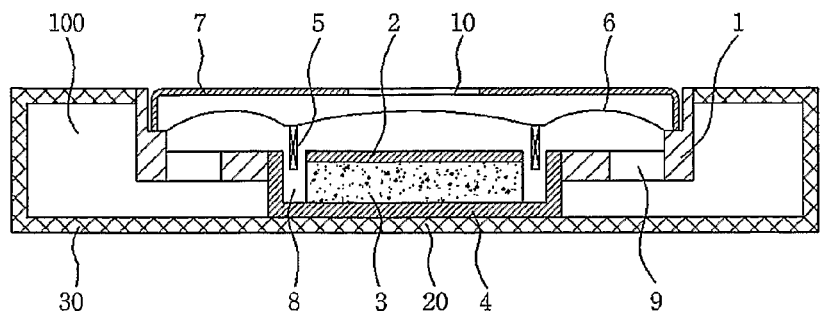
[Fig. 2]
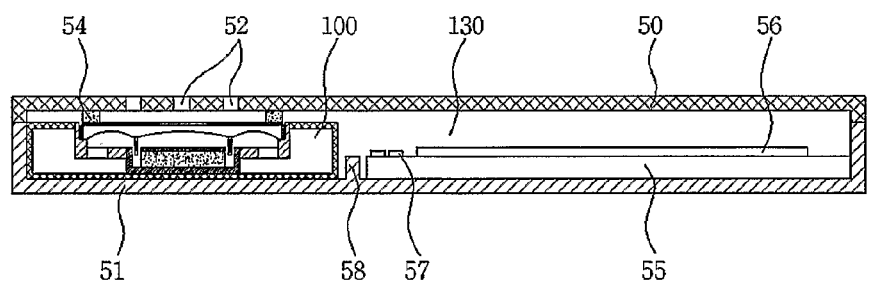
[Fig. 3]
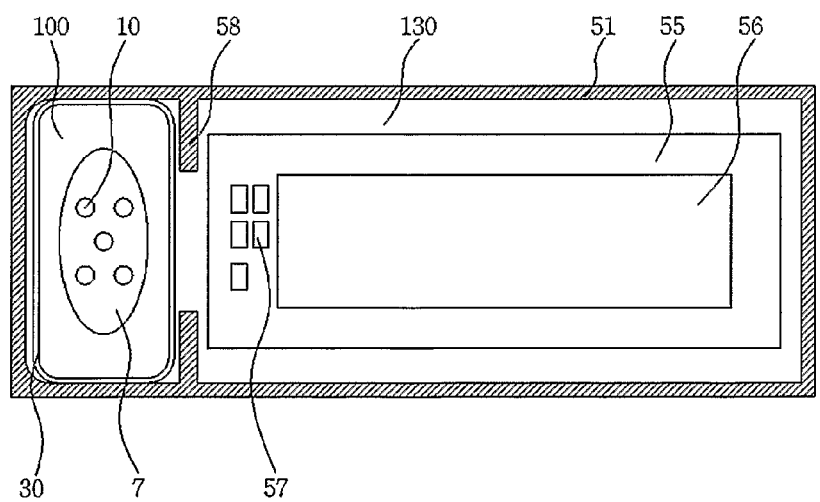
[Fig. 4]
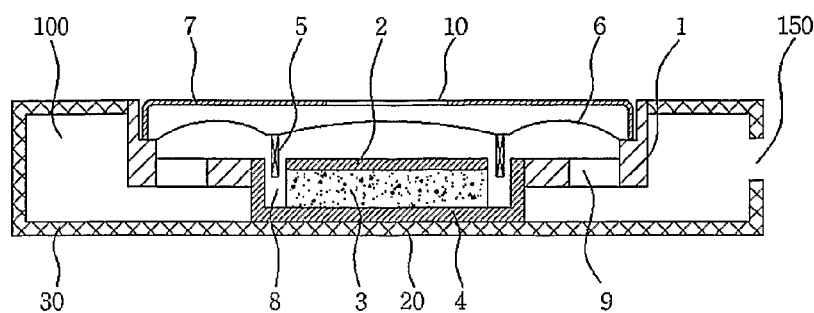

[Fig. 5]
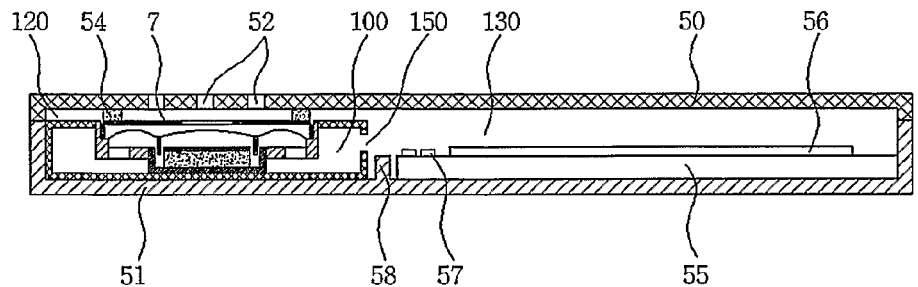
[Fig. 6]
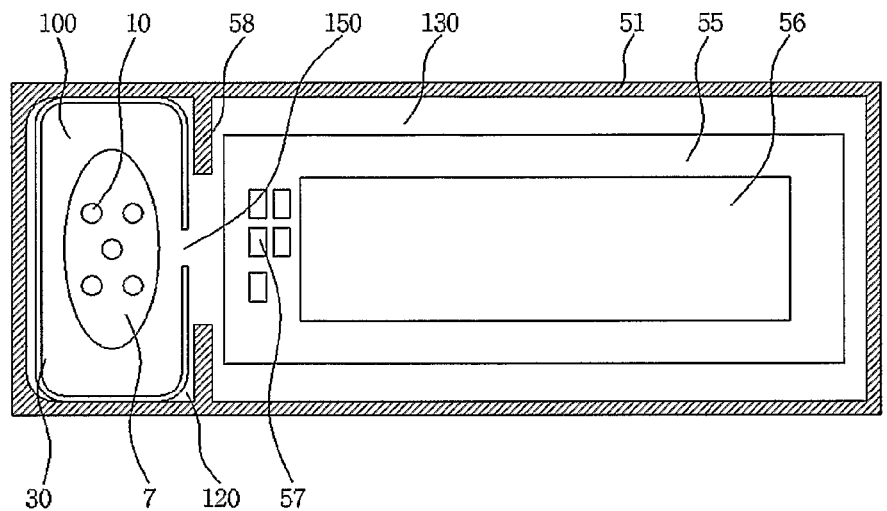
[Fig. 7]
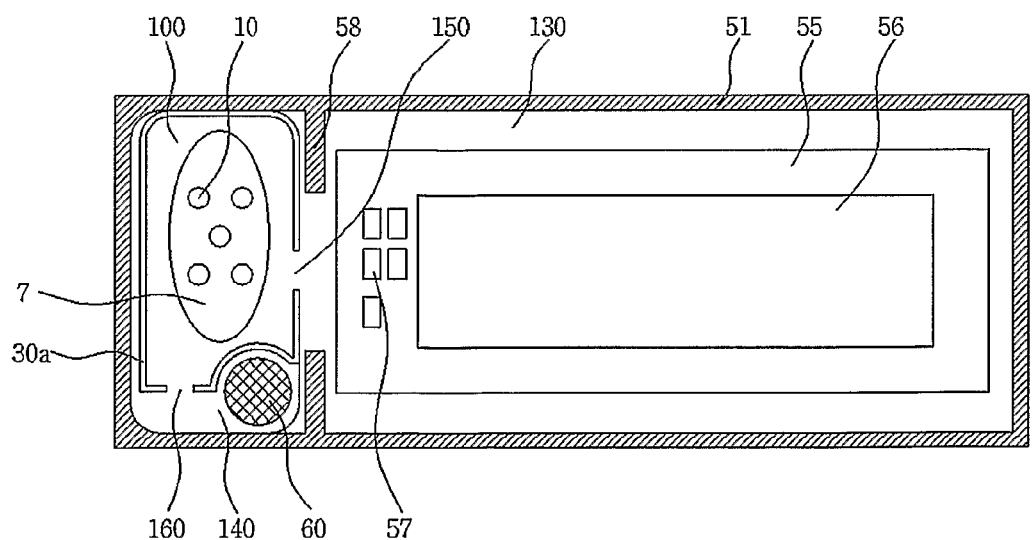

[Fig. 8]
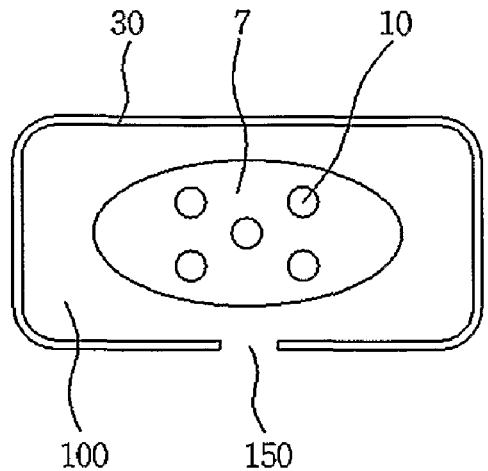
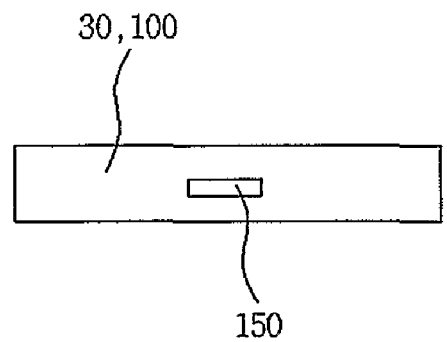
[Fig. 9]
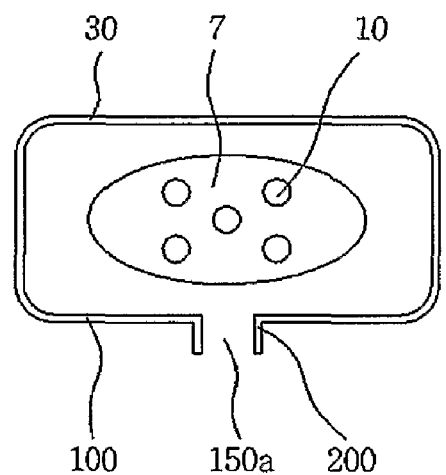
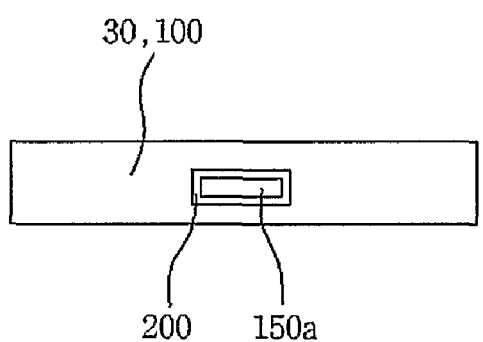
[Fig. 10]
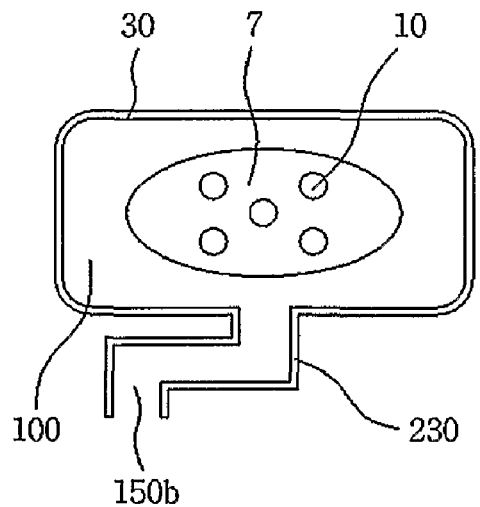
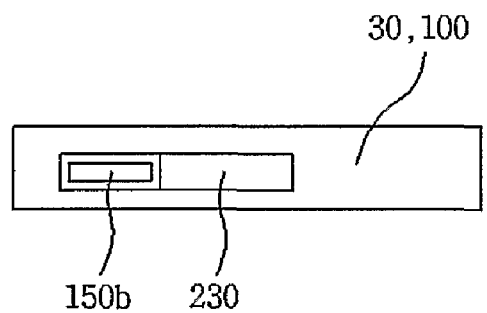

[Fig. 11]
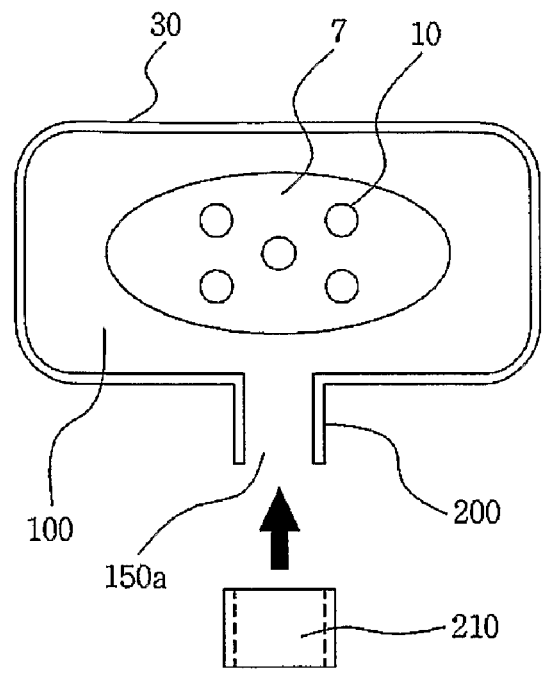
[Fig. 12]
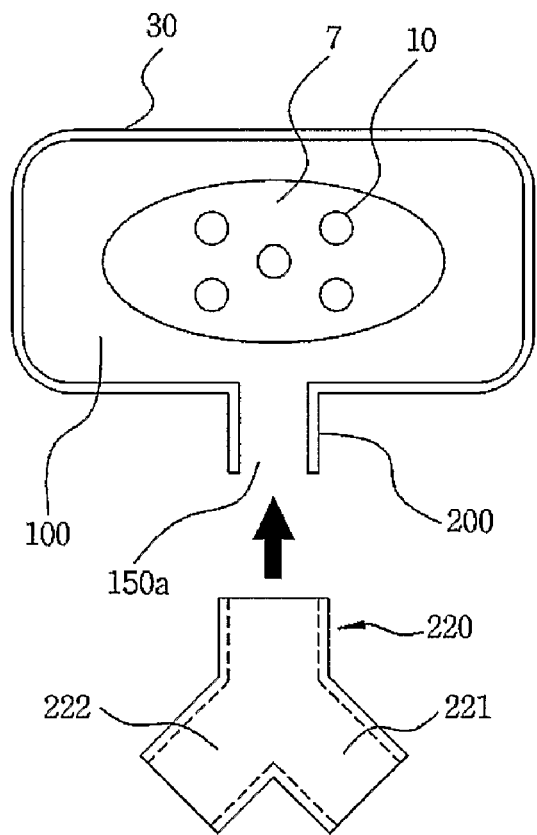

[Fig. 13]
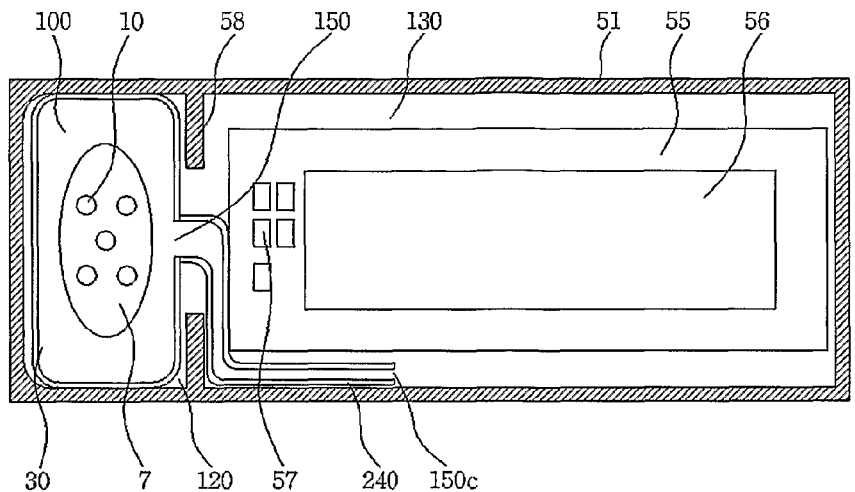
[Fig. 14]
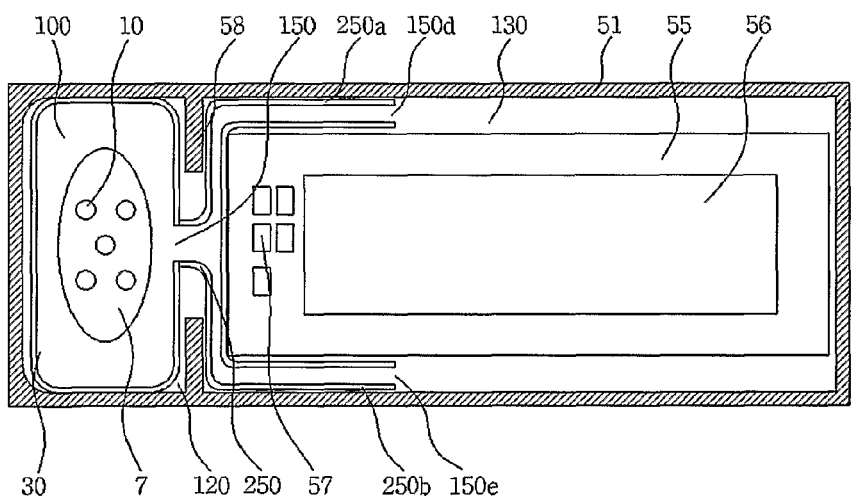
[Fig. 15]
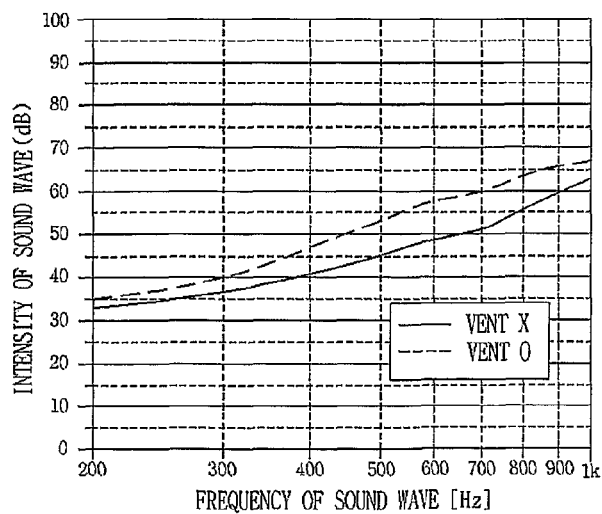

SOUND CONVERTER WITH ENCLOSURE

TECHNICAL FIELD

The present invention relates to a sound converter with an enclosure, and more particularly, to a sound converter with an enclosure which utilizes an outer space to expand a resonance space.

BACKGROUND ART

In general, a sound converter for converting an electric signal into a sound signal is installed in a portable communication terminal.

FIG. 1 is a cross-sectional view illustrating a conventional sound converter with an enclosure, and FIGS. 2 and 3 are cross-sectional views illustrating states where the conventional sound converter with the enclosure is mounted in a portable terminal.

The conventional sound converter with the enclosure includes a lower case 20 injection-molded with a synthetic resin in a predetermined shape, a yoke 4, a magnet 3 and a top plate 2 successively seated on a seating portion of the lower case 20, a diaphragm 6, a voice coil 5 fixed to the bottom surface of the diaphragm 6, a protector 7 formed at the upper portion of the lower case 20, for protecting the diaphragm 6, the protector 7 being provided with a plurality of sound emitting holes 10 for smoothly emitting a sound generated at the front (upper portion) of the diaphragm 6, lower sound emitting holes 9 for smoothly emitting a sound generated at the rear (lower portion) of the diaphragm 6, and an enclosure 100 operated as a resonance space.

Therefore, when an electric signal is applied to the voice coil 5, the attraction and repulsion occur between an electromagnetic force formed in the voice coil 5 and a magnetic force formed in the yoke 4, the magnet 3 and the top plate 2, so that the diaphragm 6 is vibrated in the forward-backward (up-down) direction with the voice coil 5 to generate a sound signal corresponding to the electric signal. A sound wave generated at the front of the diaphragm 6 is output in the forward direction through the upper sound emitting holes 10 of the protector 7, and a sound wave generated at the rear of the diaphragm 6 is output in the backward direction through the lower sound emitting holes 9.

Meanwhile, as the front sound emitted to the front of the sound converter and the rear sound emitted to the rear thereof have a phase difference of 180, they offset each other. It is thus impossible to reproduce a low-pitched sound. For example, if the front sound and the rear sound are not intercepted, a low range sound is removed by offset and a high range sound is left, which makes it difficult to reproduce a natural sound. Accordingly, in order to intercept the rear sound emitted to the rear of the sound converter, it is preferable to install a predetermined size of enclosure (back volume) at the rear of the sound converter. Moreover, the enclosure functioning as a resonance space for sound resonance is necessary in the sound converter.

That is, the large size of the enclosure is advantageous to improve the quality of the high and low range sounds. However, the size of the enclosure is restricted in the sound converter due to a thinning and miniaturizing tendency. In addition, if a small-sized enclosure is installed on a rear surface of a diaphragm, an amplitude of the diaphragm is narrowed due to the rise of an air pressure in the enclosure. Therefore, only a high range sound is reproduced.

DISCLOSURE OF INVENTION

Technical Problem

An object of the present invention is to provide a sound converter with an enclosure which can define a resonance space not to be interrupted by a sound emitted from a sound emitting hole in spite of a miniaturization tendency, and a mobile communication terminal using the same.

Another object of the present invention is to provide a sound converter with an enclosure which can prevent an amplitude of a diaphragm from being narrowed by the enclosure, and expand a resonance space by using an inside of a portable terminal as the resonance space through a vent facing the inside of the portable terminal, and a mobile communication terminal using the same.

Technical Solution

In order to achieve the above-described objects of the invention, there is provided a sound converter with an enclosure, including: a frame, a magnetic circuit for forming a magnetic field being mounted in a predetermined gap thereof; a voice coil at least partially positioned in the gap; a diaphragm adhered to the voice coil and inserted into a diaphragm seating portion of the frame; a protector formed at the upper portion of the diaphragm; and an enclosure case coupled to the frame, for defining the inner space of the enclosure which is a resonance space, wherein a vent is provided at the enclosure case so that the inner space of the enclosure can communicate with an outer space. This configuration can secure a wide resonance space.

Preferably, one or more vents are formed.

Preferably, an extension member extending in an outward direction by a pre-determined length is provided at the vent.

Preferably, a plurality of lower extension members extending in outward directions respectively are provided at the extension member.

Preferably, the extension member or the lower extension members are flexible.

Preferably, the flexible extension member or lower extension members contain polypropylene or polyethylene.

In addition, there is provided a mobile communication terminal wherein a sound converter with an enclosure is mounted in an enclosure accommodating portion, and a PCB with a display and a main board mounted thereon is mounted in a board accommodating portion, wherein one or more vents are provided at an enclosure case of the sound converter with the enclosure so that the inner space of the enclosure can communicate with the enclosure accommodating portion or the board accommodating portion.

Advantageous Effects

According to the present invention, the vent and the extension member connecting to the vent are used to connect the inner space of the enclosure to the outer space or the inner space (accommodating space) of the mobile communication terminal. As a result, the resonance space of the sound converter is expanded.

In addition, according to the present invention, as the sound attenuation is prevented the to the expansion of the resonance space, the sound conversion can be efficiently carried out.

BRIEF DESCRIPTION OF THE DRAWINGS

The present invention will become better understood with reference to the accompanying drawings which are given only by way of illustration and thus are not limitative of the present invention, wherein:

FIG. 1 is a cross-sectional view illustrating a conventional sound converter with an enclosure;

FIGS. 2 and 3 are cross-sectional views illustrating states where the conventional sound converter with the enclosure is mounted in a portable terminal;

FIG. 4 is a cross-sectional view illustrating a sound converter with an enclosure in accordance with the present invention;

FIGS. 5 and 6 are cross-sectional views illustrating states where the sound converter with the enclosure according to the present invention is mounted in a portable terminal;

FIG. 7 is a configuration view illustrating another position of a vent in accordance with the present invention;

FIGS. 8 to 10 are configuration views illustrating various shapes of vents in accordance with the present invention;

FIGS. 11 and 12 are views illustrating states where a supplementary lower extension member is connected to an extension member extending from a vent;

FIGS. 13 and 14 are views illustrating sound converters with enclosures including flexible extension members coupled to vents, respectively;

FIG. 15 is a graph showing sound properties of the sound converter with the enclosure according to the existence and absence of the vent.

BEST MODE FOR CARRYING OUT THE INVENTION

A sound converter with an enclosure in accordance with preferred embodiments of the present invention will be described in detail with reference to the accompanying drawings.

FIG. 4 is a cross-sectional view illustrating a sound converter with an enclosure in accordance with the present invention, and FIGS. 5 and 6 are cross-sectional views illustrating states where the sound converter with the enclosure according to the present invention is mounted in a mobile communication terminal.

Referring to FIG. 4, the sound converter with the enclosure according to the present invention includes a frame 1 on which a yoke 4, a magnet 3 and a top plate 2 are successively assembled, a voice coil 5 positioned in a gap 8 formed between the yoke 4 and the magnet 3, a diaphragm 6 adhered to the voice coil 5 and inserted into a diaphragm seating portion of the frame 1 to be vibratable, upper sound emitting holes 10 formed at the upper portion of the diaphragm 6, lower sound emitting holes 9 formed at the lower portion of the diaphragm 6, a protector 7 formed at the upper portion of the diaphragm 6 with the upper sound emitting holes 10, and an enclosure case 30 coupled to the frame 1, for defining an enclosure 100 (or the inner space of the enclosure) which is a predetermined size of resonance space. The enclosure case 30 includes a predetermined size of vent 150 so that the inner space of the enclosure 100 can communicate with the outer space or the inner space of the mobile communication terminal.

The operation principle of the sound converter will be explained.

The yoke 4, the magnet 3 and the top plate 2 constitute a magnetic circuit for forming a magnetic field in the gap 8. The magnetic circuit has been publicly known to the ordinary people in the art to which the present invention pertains. For another example, a magnetic circuit may include an inner ring magnet, an inner ring top plate corresponding to the inner ring magnet, an outer ring magnet, an outer ring top plate corresponding to the outer ring magnet, and a yoke on which the inner ring magnet and the cuter ring magnet are mounted.

The voice coil 5 is at least partially positioned in the gap 8. When an AC electric signal is applied to the voice coil 5, the voice coil 5 is vibrated in the up-down direction due to an interaction of a magnetic field formed by the magnetic circuit and a current. At the same time, the diaphragm 6 coupled to the voice coil 5 is vibrated to vibrate the air, thereby generating a sound.

A sound wave generated at the front of the diaphragm 6 is output to the front through the upper sound emitting holes 10 of the protector 7, and a sound wave generated at the rear of the diaphragm 6 is output to the rear through the lower sound emitting holes 9.

In the sound converter with the above-described configuration, the sound wave emitted to the front and the sound wave emitted to the rear are offset due to a phase difference of 180° which makes it difficult to reproduce a natural sound. Therefore, the sound converter needs a resonance space for improving the quality of sound. In order to solve the foregoing problem, in the prior art, the enclosure 100 (or the inner space of the enclosure) coupled to the frame 1 is installed in the downward direction of the diaphragm 6.

When the resonance space in the enclosure 100 is expanded, a resistivity multiple is decreased, so that the sound attenuation by the vibration of the diaphragm 6 is decreased. On the contrary, when the resonance space in the enclosure 100 is narrowed, the resistivity multiple is sharply increased, so that the sound attenuation is increased. Accordingly, the expansion of the resonance space in the enclosure 100 is advantageous in function.

However, in consideration of the miniaturization and thinning tendency of the mobile communication terminal or portable terminal, the enclosure 100 can occupy only a predetermined thickness and space. That is, the installation space of the enclosure 100 is narrow.

In order to solve the above problem, the present invention intends to expand the whole resonance space by using the inner space of the portable terminal as the resonance space by connecting the inner resonance space of the enclosure 100 to the inner space of the portable terminal main body through the vent 150.

FIGS. 5 and 6 are cross-sectional views illustrating states where the sound converter with the enclosure according to the present invention is mounted in the portable terminal.

As illustrated in FIGS. 5 and 6, the sound converter with the enclosure is stably inserted into an enclosure accommodating portion 120 formed in a lower case 51 of the portable terminal, and a fixing guide 58 for fixing the sound converter with the enclosure is formed on the inner surface of the lower case 51. In addition, a main board 55 with a plurality of chips 57 and an LCD 56 mounted thereon is stably inserted into a board accommodating portion 130. An upper case 50 with sound emitting holes 52 is formed to correspond to the lower case 51. A sound leakage preventing cushion is interposed between the upper case 50 and the protector 7.

The vent 150 formed at the enclosure case 30 faces the board accommodating portion 130 or the enclosure accommodating portion 120, so that the sound in the enclosure 100 passes through the vent 150 and travels to the board accommodating portion 130 or the enclosure accommodating portion 120. That is, the vent 150 connects the enclosure 100 to the board accommodating portion 130 or the enclosure accommodating portion 120 to wholly expand the resonance space.

FIG. 7 is a configuration view illustrating another position of the vent in accordance with the present invention. An enclosure accommodating portion 140 accommodates an enclosure case 30*a* of a sound converter and a vibration motor 60. A second vent 160 is formed at the enclosure case 30*a* to connect to the enclosure accommodating portion 140. As compared with the example of FIGS. 5 and 6, the example of FIG. 7 further uses the enclosure accommodating portion 140 as a resonance space.

FIGS. 8 to 10 are configuration views illustrating various shapes of vents in accordance with the present invention.

As depicted in FIG. 8, an enclosure case 30 is provided with a vent 150 connecting to an outer space. The vent 150 is formed at the center of the side face of the enclosure case 30.

As shown in FIG. 9, an enclosure case 30 is provided with a vent 150a connecting to an outer space. Differently from the example of FIG. 8, a tubular extension member 200 with a predetermined length is further mounted at the vent 150a in an outward direction. Therefore, a resonance space of an enclosure 100 is additionally expanded by at least a volume of the extension member 200.

As illustrated in FIG. 10, an enclosure case 30 is provided with a vent 150b connecting to an outer space. The vent 150b is formed between an enclosure 100 and the outer space through an extension member 230 with a bend. The extension member 230 has a larger volume than the extension member 200 of FIG. 8 in an outward direction, which additionally increases a resonance space.

The extension members 200 and 230 of FIGS. 9 and 10 can be integrally injection-molded with the enclosure case 30, or can be separately manufactured and adhered to the vent 150 of FIG. 8.

FIGS. 11 and 12 are views illustrating states where a supplementary lower extension member is connected to the extension member 200 extending from the vent 150.

Referring to FIG. 11, the cuter portion of the extension member 200 is fixedly inserted into a lower extension member 210, which increases the whole extension length or volume. As the lower extension member 210 is made of a flexible material, it can be easily fitted around the extension member 200. Preferably, the lower extension member 210 is made of a flexible material, particularly, polypropylene or polyethylene. The extension member 200 can also be made of a flexible material.

As shown in FIG. 12, a lower extension member 220 can be fitted around the cuter portion of the extension member 200. The lower extension member 220 has a plurality of extension portions 221 and 222 extending in different directions or the same direction. The extension portions 221 and 222 are made of a flexible material, so that they are easily fitted around the extension member 200. Still referring to FIG. 12, the lower extension member 220 can be provided as an inverse Y shaped duct.

FIGS. 13 and 14 are cross-sectional views illustrating portable terminals including sound converters with enclosures having flexible extension members, respectively.

As illustrated in FIG. 13, an extension member 240 connecting to a vent 150 of an enclosure case 30 passes through an enclosure accommodating portion 120 enters a board accommodating portion 130, and extends along a space between a lower case 51 and a board 55 or along the side face of the board 55 or the lower case 51. The extension member 240 can extend along the lower portion of the board 55. This flexible extension member 240 can clearly secure a resonance space in a narrow portable terminal case 50 and 51.

As shown in FIG. 14, an extension member 250 connecting to a vent 150 of an enclosure case 30 passes through an enclosure accommodating portion 120, enters a board accommodating portion 130, and extends along both side faces of a board 55. That is, vents 150d and 150e connect to the board accommodating portion 130 through extension portions 250a and 250b of the extension member 250.

In FIGS. 13 and 14, the extension members 240 and 250 have flexibility and insulation properties. Accordingly, even if the extension members 240 and 250 partially contact the board 55, an electric short does not occur. Moreover, the extension members 240 and 250 are fixedly seated on the side face of the board 55 or the lower case 51, and thus protected from unexpected vibration.

As the resonance space in the enclosure is expanded, the increment rate (multiple) of the resistivity is sharply decreased.

FIG. 15 is a graph showing sound properties of the sound converter with the enclosure according to the existence and absence of the vent, particularly, the relation between a frequency and an intensity of a sound wave according to the existence and absence of the vent. Referring to FIG. 15, the intensity of the sound wave is greater between 200 Hz and 1 kHz when the vent exists than when the vent does not exist.

Although the preferred embodiments of the present invention have been described, it is understood that the present invention should not be limited to these preferred embodiments but various changes and modifications can be made by one skilled in the art within the spirit and scope of the present invention as hereinafter claimed.

The invention claimed is:

1. A sound converter with an enclosure, wherein the enclosure is installable in an inner space of a mobile communication terminal main body, comprising:
   a frame being equipped with a magnetic circuit for forming a magnetic field in a predetermined gap;
   a voice coil at least partially positioned in the gap;
   a diaphragm adhered to the voice coil and inserted into a diaphragm seating portion of the frame;
   a protector formed at the upper portion of the diaphragm; and
   an enclosure case coupled to the frame, for defining an inner space of the enclosure which is a resonance space, wherein a vent is provided at the enclosure case so that the inner space of the enclosure can communicate with the inner space of the mobile communication terminal main body.

2. The sound converter with the enclosure of claim 1, wherein one or more vents are formed.

3. The sound converter with the enclosure of claim 1, wherein an extension member extending from the vent into the inner space of the mobile communication terminal main body by a predetermined length is provided at the vent.

4. The sound converter with the enclosure of claim 3, wherein a plurality of lower extension members extending into the inner space of the mobile communication terminal main body respectively are additionally provided at the extension member.

5. The sound converter with the enclosure of claim 3, wherein the extension member is flexible.

6. The sound converter with the enclosure of claim 5, wherein the flexible extension member contains polypropylene or polyethylene.

7. A mobile communication terminal wherein an inner space of the mobile communication terminal is divided into an enclosure accommodating portion and a board accommodating portion,
   wherein a sound converter with an enclosure is mounted in the enclosure accommodating portion,
   wherein a PCB with a display and a main board are mounted in the board accommodating portion, and
   wherein one or more vents are provided at an enclosure case of the enclosure so that the inner space of the enclosure can communicate with the enclosure accommodating portion or the board accommodating portion.

8. The mobile communication terminal of claim 7, wherein the vent faces the board accommodating portion.

9. The mobile communication terminal of claim 7, wherein the vent faces the enclosure accommodating portion.

10. The mobile communication terminal of claim 7, wherein an extension member extending to the enclosure accommodating portion or the board accommodating portion by a predetermined length is provided at the vent.

11. The mobile communication terminal of claim 10, wherein a plurality of lower extension members extending to the board accommodating portion respectively are additionally provided at the extension member.

12. The mobile communication terminal of claim 10, wherein the extension member extends along the side face or the bottom face of the main board.

13. The mobile communication terminal of claim 10, wherein the extension member is flexible.

14. The mobile communication terminal of claim 13, wherein the flexible extension member contains polypropylene or polyethylene.

15. The sound converter with the enclosure of claim 4, wherein the lower extension members are flexible.

16. The sound converter with the enclosure of claim 15, wherein the lower extension members contain polypropylene or polyethylene.

17. The mobile communication terminal of claim 11, wherein the lower extension members extend along a side face or a bottom face of the main board.

18. The mobile communication terminal of claim 11, wherein the lower extension members are flexible.

19. The mobile communication terminal of claim 18, wherein the lower extension members contain polypropylene or polyethylene.

* * * * *